United States Patent Office 3,071,562
Patented Jan. 1, 1963

3,071,562
ALIPHATIC MODIFIED EPOXIDE RESINS
Herbert P. Price and William J. Belanger, Louisville, Ky., assignors to Devoe & Raynolds Company, Inc., Louisville, Ky., a corporation of New York
No Drawing. Filed Dec. 12, 1958, Ser. No. 779,838
3 Claims. (Cl. 260—47)

This invention relates to improvements in the production of complex aliphatic-modified epoxide resins and includes a new process of producing the resins and the improved resins resulting therefrom.

The improved products of the present invention are produced by the dehydrohalogenation reaction of 1 mol of a dichlorohydrin ether of a polyhydric alcohol and 1 or more mols of a monochlorohydrin ether of hydroxyalkyl and hydroxy-aliphatic ethers of dihydric phenols in the presence of an alkaline dehydrohalogenating agent.

The new epoxide resins have terminal glycidyl groups and intermediate aromatic and aliphatic groups joined together through ether oxygen.

The proportions of the dichlorohydrin ethers and of the monochlorohydrin ethers can be varied from 1 mol of each, to several mols of the monochlorohydrin ether for each mol of the dichlorohydrin ether.

The dichlorohydrin ethers of the polyhydric alcohols can be readily prepared by reacting the polyhydric alcohol with epichlorohydrin in the presence of a condensation catalyst, advantageously of the $BF_3$ type, such as boron trifluoride ether complex or etherate. The reaction is an addition reaction between the epoxy group of the epichlorohydrin and the hydroxyl groups of the alcohol. In this reaction, no excess of epichlorohydrin is necessary in the formation of the chlorohydrin ethers and all or substantially all of the epichlorohydrin initially added to the polyhydric alcohol is caused to react therewith. The products are mainly dichlorohydrin ethers admixed with small amounts of monofunctional chlorohydrin ethers. Most of the chlorine of the chlorohydrin ethers is active chlorine, but some small amount is usually present as inactive chlorine, as hereinafter explained.

The polyhydric alcohols used in producting the dichlorohydrin ethers contain at least 2 hydroxyl groups, and may contain more than 2 hydroxyl groups. Polyhydric alcohols having a hydrocarbon chain between the two hydroxyl groups are advantageous in imparting an added aliphatic hydrocarbon element or residue into the dichlorohydrin ethers and in the final epoxide resins made therefrom. Among such alcohols are ethylene glycol, butanediol, pentanediol, diethylene glycol, triethylene glycol, hexanetriol, glycerol and various polyethylene glycols and polypropylene glycols, etc.

The polyhydric alcohols used in forming the chlorohydrin ethers include dihydroxyalkyl ethers of dihydric phenols, for example, the dihydroxyethyl ethers of bisphenol, resorcinol, etc.

Where the polyhydric alcohol contains more than 2 hydroxyl groups, the dichlorohydrin ethers will still contain one or more reactive hydroxyl groups in addition to the 2 chlorohydrin ether groups, e.g., a dichlorohydrin ether of a trihydric alcohol.

These dichlorohydrin ethers of polyhydric alcohols have the following general formula:

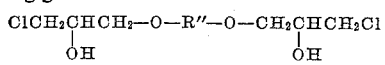

in which R" is the divalent residue of the polyhydric alcohol.

The hydroxyalkyl or hydroxy-aliphatic ethers of dihydric phenols, from which the chlorohydrin ethers are prepared, can be readily prepared by reacting 1 mol of dihydric phenol with 1 mol of a simple or substituted alkyl or aliphatic chlorohydrin, using sodium hydroxide as the condensing or dehydrohalogenating agent; or by reacting 1 mol of dihydric phenol with 1 mol of a simple or substituted alkyl or aliphatic carbonate using potassium carbonate as the catalyst; or by reacting 1 mol of dihydric phenol with 1 mol of a simple or substituted aliphatic monoepoxide.

The formation of the hydroxyalkyl or hydroxy-aliphatic ethers of a dihydric phenol is illustrated by the following equation, in which R is the aromatic nucleus of the dihydric phenol and R' is the radical of the simple or substituted alkyl group, including alkylether substituted alkyl groups, and which may be defined as a simple or substituted aliphatic divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups:

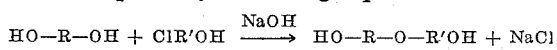

Examples of the hydroxyalkyl ethers are the hydroxyethyl ether of the dihydric phenol, such as bisphenol, in which R' is the $-CH_2CH_2-$ group, which can readily be prepared by the reaction of ethylene chlorhydrin with a dihydric phenol with the use of caustic soda as the dehydrohalogenating agent. The use of glyceryl monochlorohydrin gives a hydroxy alkylether in which R' is the

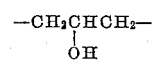

group, this being the dihydroxypropyl ether of the dihydric phenol.

In a similar manner, the use of other aliphatic chlorohydrins can be used to give other hydroxyalkyl or substituted hydroxyalkyl ethers of the dihydric phenols.

The dihydroxypropyl ether of the dihydric phenol can also be prepared by reacting 1 mol of the dihydric phenol with 1 mol of glycidol. And other monoepoxides can be similarly used to produce other hydroxyalkyl and substituted hydroxyalkyl derivativs. Thus, the use of phenylglycide ether for reacting with the dihydric phenol gives a product in which the group R' in the above formula is

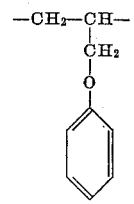

In this case, the alkyl group has a hydrocarbon ether substituent. Other simple or substituted hydroxyalkyl derivatives can be produced by the use of other monoepoxides such as ethylene oxide, butylglycidyl ether, isopropylglycidyl ether, styrene oxide, etc.

In addition to the simple and substituted hydroxyalkyl ethers, substituted in the alkyl group, somewhat more complex hydroxyalkyl or hydroxy-aliphatic derivatives of the dihydric phenols can be produced by reacting 1 mol of the dihydric phenol with the monochlorohydrin ether of a mono-, di-, or trihydric alcohol, or by reacting 1 mol of the dihydric phenol with 1 mol of a moniglycide ether such as the monoglycide ethers of di-, tri-, or higher polyhydric alcohols. For example, 1 mol of the monoglycide ether if trimethylol propane can be reacted with 1 mol of a dihydric phenol such as bisphenol to form the corresponding hydroxy-containing monoether. Or 1 mol of the monochlorohydrin ether of trimethylol propane can be reacted with 1 mol of a dihydric phenol such as bisphenol to form the hydroxy-containing monoether. The resulting hydroxyalkyl or hydroxy-aliphatic ether of the dihydric phenol in this case will have a formula in which R' is the following group:

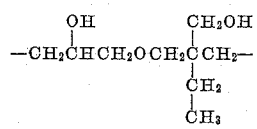

The hydroxyalkyl or hydroxy-aliphatic ethers of the dihydric phenols have both alcoholic hydroxyl and phenolic hydroxyl groups.

The monochlorohydrin ethers are produced by reacting 1 mol of the hydroxyalkyl ether or the hydroxy-aliphatic ether of the dihydric phenol with 1 mol of epichlorohydrin in the present of a condensation catalyst, and particularly a $BF_3$ catalyst such as a boron trifluoride ether complex or etherate, to form the chlorohydrin ether. This reaction of epichlorohydrin is with the alcoholic hydroxyl group, or with one of the alcoholic hydroxyl groups, leaving the phenolic hydroxyl group largely unreacted. This reaction is illustrated by the following equation, in which R and R' have the same meaning above indicated:

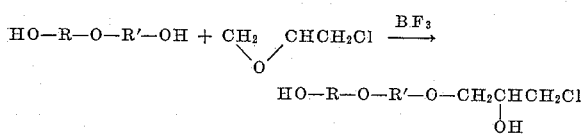

Such monochlorohydrin ethers have a free terminal phenolic hydroxyl which can react with epoxide groups by direct addition. The other end of the molecule of the monochlorohydrin ether is a chlorohydrin group which, on dehydrohalogenation, is converted to an epoxide group, which can react by direct addition with a phenolic hydroxyl group.

The reaction between the dichlorohydrin ether of the polyhydric alcohol and the monochlorohydrin ether of the hydroxyalkyl or hydroxy-aliphatic ether of a dihydric phenol is brought about with the use of alkaline agents, such as caustic alkali, which act as dehydrohalogenating agents, including alkaline agents which are effective dehydrohalogenating agents for the dichlorohydrin ether and which are active agents in producing epoxide resins from epichlorohydrin and dihydric phenols.

The reaction can be carried out in an organic solvent such as dioxane, methyl isobutyl ketone, xylol, etc., using sodium hydroxide as the alkaline reagent.

It is one advantage of the present process, however, that it can be carried out with the use of aqueous alkali and in a manner similar to that used in the production of epoxide resins from dihydric phenols and epichlorohydrin.

Different alkaline agents can be used, including alkali metal complexes and salts such as sodium silicate, sodium aluminate, sodium zincate, etc. But it is one advantage of the present process that caustic alkali can be used in aqueous solution for carrying out the process.

The amount of alkali used is based on the amount required to dehydrohalogenate both the dichlorohydrin ether and the monochlorohydrin ether together with a small excess over this amount.

In both the dichlorohydrin ethers and the monochlorohydrin ethers formed in the manner above described, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1) 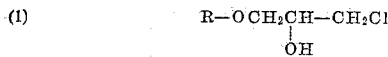

This compound is easily dehydrohalogenated to give an epoxide compound.

Inactive chlorines are formed by the addition of epichlorohydrin to the hydroxyl group in the above compound.

(2) 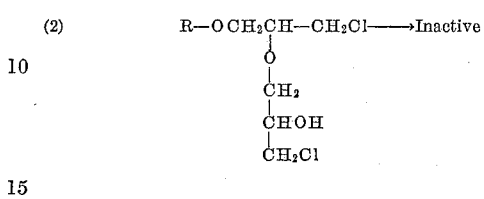

The above labeled chlorine cannot be removed to form an epoxide group since no hydroxyl is present on an adjacent carbon.

Resins varying in molecular weight over a wide range can be prepared by varying the proportions of the dichlorohydrin ethers and monochlorohydrin ethers, but the ratio of monochlorohydrin ether should be at least 1 mol for each mol of the dichlorohydrin ether and may be increased to 2, 3, 4, 5 or more mols of the monochlorohydrin ether for 1 mol of the dichlorohydrin ether.

The products produced by the present process are composite products of a distinctive nature in that they contain the residue of the dichlorohydrin ether of the polyhydric alcohol as well as the residue of the monochlorohydrin ether of the hydroxyalkyl ether of the dihydric phenol. However, only 1 dichlorohydrin ether residue is present in the resulting product, while 1 or more than 1 residue of the monochlorohydrin ether may be present. The products are characterized by containing glycidyl groups as terminal groups, which glycidyl groups will be in part or in whole united directly to a dihydric phenol nucleus through an ether linkage and may be in part united to the polyhydric alcohol residue through an ether linkage.

Thus, the reaction of 1 mol of a dichlorohydrin ether of a dihydric alcohol such as glycol with 1 mol of a monochlorohydrin ether of a hydroxy-aliphatic ether of a dihydric phenol gives a product, on dehydrohalogenation, which can be considered to have, for the most part, the following formula:

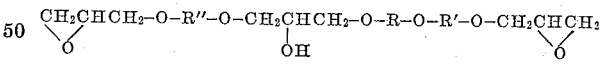

in which R'' is the divalent residue of the aliphatic polyhydric alcohol, e.g., in the case of glycol —$CH_2CH_2$—, and R is the hydrocarbon residue of the dihydric phenol of the monochlorohydrin ether, such as bisphenol, and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups.

In the production of the above product, one of the chlorohydrin groups of the dichlorohydrin ether, on dehydrohalogenation, combines with the free phenolic hydroxyl of the monochlorohydrin ether, while the other chlorohydrin group of the dichlorohydrin ether and the chlorohydrin group of the monochlorohydrin ether are dehydrohalogenated to produce epoxide or glycidyl groups.

When 2 mols of the monochlorohydrin ether are reacted with 1 mol of the dichlorohydrin ether, the resulting product, on dehydrohalogenation, may be considered, for the most part, to have one or the other of the following formulas or to be in part made up of the product of each formula:

$$CH_2CHCH_2-O-R''-O-CH_2CHCH_2-O-R-O-R'-O-CH_2CHCH_2-O-R-O-R'-O-CH_2CHCH_2$$
$$\underset{O}{\diagdown\diagup} \qquad\qquad\qquad\quad \underset{OH}{|} \qquad\qquad\qquad \underset{OH}{|} \qquad\qquad\qquad\qquad \underset{O}{\diagdown\diagup}$$

$$CH_2CHCH_2-O-R'-O-R-O-CH_2CHCH_2-O-R''-O-CH_2CHCH_2-O-R-O-R'-O-CH_2CHCH_2$$
$$\underset{O}{\diagdown\diagup} \qquad\qquad\qquad\quad \underset{OH}{|} \qquad\qquad\qquad \underset{OH}{|} \qquad\qquad\qquad\qquad \underset{O}{\diagdown\diagup}$$

in which R, R' and R'' have the same meaning above indicated.

The above products, and other products made when more than 2 mols of the monochlorohydrin ether react with 1 mol of the dichlorohydrin ether, may be considered to be represented by the following formula:

$$CH_2CHCH_2-O-\left[R'-O-R-O-CH_2CHCH_2-O\right]_m-R''-\left[O-CH_2CHCH_2-O-R-O-R'\right]_n-O-CH_2CHCH_2$$
$$\underset{O}{\diagdown\diagup} \qquad\qquad\qquad\qquad\qquad \underset{OH}{|} \qquad\qquad\qquad\qquad\qquad\qquad \underset{OH}{|} \qquad\qquad\qquad\qquad \underset{O}{\diagdown\diagup}$$

in which R, R' and R'' have the same meaning above indicated and in which m or n can vary from zero to a much larger number, with m plus n equalling at least 1. The formula of the reaction product of 1 mol of monochlorohydrin and 1 mol of dichlorohydrin, above indicated, would be illustrated by the above formula, in which m is zero and n is 1, or n is zero and m is 1. The above formulas representing the reaction products of 2 mols of monochlorohydrin with 1 mol of dichlorohydrin would be illustrated by the above general formula, in which m is zero and n is 2, or in which m and n are each 1. Where more than 2 mols of the monochlorohydrin ether react with 1 mol of the dichlorohydrin ether, the number of mols of monochlorohydrin ether will be represented by a value approximating m plus n, where m plus n may be up to 5 or 10 or 15 or even more.

The formulae of the products may vary somewhat because of the fact that some of the chlorine of the chlorohydrins is inactive chlorine, as above explained, which will somewhat modify the portions of the molecule containing the inactive chlorine.

It will be evident that the above formulas are illustrative and that the reaction products may contain a mixture of molecules varying somewhat from each other.

The terminal groups of the products are glycidyl groups united through an ether oxygen linkage. Part or all of the terminal glycidyl groups will be united to an aromatic residue of the dihydric phenol. Some of the terminal glycidyl groups may be united through ether oxygen to the residue of the polyhydric alcohol.

Where more than 1 mol of the monochlorohydrin ether is used per mol of dichlorohydrin ether, the free phenolic hydroxyl of the monochlorohydrin ether can react with an epoxide group formed either from the chlorohydrin group of the monochlorohydrin ether or with an epoxide group formed from one of the chlorohydrin groups of the dichlorohydrin ether.

The following description and examples further illustrate the invention, but it will be understood that the invention is not limited thereto.

Examples 1 to 7 illustrate the production of the dichlorohydrin ethers of the polyhydric alcohols.

Example 1

To a one liter flask equipped with stirrer, thermometer, condenser and addition tube was added 180 grams (2 mols) of 1,4-butanediol and 1 cc. of $BF_3$ etherate (47% $BF_3$). This solution was heated to 60° C. where dropwise addition of 370 grams (4 mols) of epichlorohydrin was begun. The epichlorohydrin was added over a period of two hours and fifteen minutes, the temperature being controlled between 60–70° C. by external cooling. After the exothermic reaction was over, the temperature was raised to 75° C. to insure complete reaction. This product analyzed 20.9% active chlorine, 25.8% total chlorine.

Example 2

To a one liter flask equipped as in Example 1, was added 307 grams (2.29 mols) of trimethylol propane. The temperature was raised to 56° C. to melt the TMP, at which point heat was removed and 1 cc. of $BF_3$ etherate was added. Dropwise addition of epichlorohydrin, 424 grams (4.58 mols) was begun and continued over a period of three hours. The temperature of the exothermic reaction was controlled between 60–70° C. by external cooling and rate of epichlorohydrin addition. This product had an active chlorine content of 19.2%, total chlorine 22.2%.

Example 3

To a one liter flask, equipped with condenser, stirrer, and thermometer was added 300 grams (½ mol) of Polyethylene Glycol 600 and 92.5 grams epichlorohydrin (1 mol). When solution was attained, 1 cc. of $BF_3$ etherate was added. The temperature of the reaction was controlled between 25–35° C. for three hours and then was raised to 50° C. to insure complete reaction. The product contained 8.2% active chlorine, 9.0% total chlorine.

Example 4

In a similar manner, the dichlorohydrin ether of Polyethylene Glycol 750 was produced containing 6.5% active chlorine and 7.6% total chlorine.

Example 5

In a similar manner, the dichlorohydrin ether of Polypropylene Glycol 1200 was produced with 5.14% active chlorine and 5.14% total chlorine.

Example 6

In a similar manner, the dichlorohydrin ether of Polypropylene Glycol 400 was produced with 10.04% active chlorine and 12.1% total chlorine.

The following example illustrates the production of a dichlorohydrin ether of a dihydric alcohol, containing intermediate aromatic groups such as the dihydroxydiethyl ether of bisphenol prepared by the reaction of 2 mols of ethylene chlorohydrin with 1 mol of bisphenol with the use of caustic soda as a condensing or dehydrohalogenating agent.

Example 7

To a two liter flask equipped with a condenser, thermometer, stirrer and dropping funnel was added 616 grams of the di(hydroxyethyl) ether of bisphenol (2 mols based on percent OH=11.05). This material was heated to 100° C. in order to melt it and 25 grams of epichlorohydrin was added to it. At 79° C. 1 cc. of $BF_3$ etherate (47% $BF_3$) was added. The reaction exothermed to 83° C. Gradual addition of epichlorohydrin was begun at this point. The temperature was controlled between 80–85° C. by the rate of epichlorohydrin addition and by the application of an external cold water bath. All the epichlorohydrin (370 grams—4 mols) was added over a period of one hour. Five grams of water was then added. This material analyzed as containing 10.9% active chlorine, 14.4% total chlorine.

The production of the monochlorohydrin ethers and of intermediates in their production is illustrated by Examples 8 to 15. Examples 8 and 9 illustrate the production of the monohydroxyethyl ether of bisphenol by two different processes.

Example 8

To a five liter flask equipped with a condenser, stirrer, and thermometer, was added 1140 grams (5 mols) of bisphenol, 210 grams sodium hydroxide (5 mols+5 wt. percent excess) and 1.5 liters of water. After the bisphenol and sodium hydroxide were dissolved, 407.5 grams (5 mols+1.25 wt. percent excess) of ethylene chlorohydrin was added. The solution was heated to reflux and held there for one hour. On cooling, the product was washed with hot water until neutral to remove the sodium chloride and other water solubles. The water was then removed by heating the material to 160° C. under 29 mm. pressure. The product analyzed 12.55% OH (theoretical 12.5%) in 100% yield (1367 grams).

*Example 9*

To the same equipment as described in Example 8, 228 grams bisphenol (1 mol) and 93 grams of ethylene carbonate (1 mol+5 wt. percent excess) were added. The mixture was heated to 130° C. to dissolve the bisphenol. Potassium carbonate, 2 grams, was added. The temperature was raised over a period of two hours to 200° C. The product was cooled and reheated to 150° C. under 70 mm. pressure. The product analyzed 12.65% OH in 100% yield (274 grams).

The compounds of Examples 8 and 9 were dark amber colored amorphous materials that were very viscous liquids at room temperature.

The hydroxyethyl ethers of resorcinol are prepared in a similar manner and are dark, viscous, amorphous liquids at room temperature.

The hydroxyethyl ethers of other dihydric phenols such as hydroquinone, 4,4′-dihydroxy diphenyl sulfone, etc. may be similarly prepared.

Other hydroxyalkyl ethers of dihydric phenols are illustrated by the following examples.

*Example 10*

To a two liter flask equipped with a mechanical stirrer, thermometer and condenser was added three mols of bisphenol (684 grams), three mols of isopropyl glycidyl ether (348 grams) and one gram of $K_2CO_3$. Heat was applied and the temperature was slowly raised to 150° C. over a period of one hour. When the heat source was removed, the temperature rose to 170° C. in 15 minutes. At this point, the temperature began to fall so heat was applied to 200° C. in thirty minutes. The material was then poured into a can to cool. The product in 100% yield analyzed at 9.9% hydroxyl (theoretical percent OH=9.9).

*Example 11*

To a two liter flask equipped as in Example 10 was added five moles of resorcinol (550 grams), and five mols of glycerine carbonate (590 grams). The mixture was heated to 130° C. where two grams $K_2CO_3$ was added. The temperature was raised to 190–200° C. and held there for three hours. At the end of this time, gas evolution was very small. The apparatus was then evacuated to 150 mm. pressure and held at this pressure and 190–200° C. for two hours. The product in 99% yield (912 grams) contained 27.0% OH (theoretical—27.7%).

The reaction of the hydroyalkyl ethers of dihydric phenols with epichlorohydrin in the presence of a $BF_3$ catalyst to form the monochlorohydrin derivative, is illustrated by the following examples:

*Example 12*

To a one liter flask equipped with condenser, stirrer, thermometer and addition tube was added 408 grams of the monohydroxyethyl ether of bisphenol (1.5 mols) and 1 cc. of $BF_3$ etherate. The temperature was raised to 43° C. where dropwise addition of epichlorohydrin was begun. The epichlorohydrin (139 grams—1.5 mols) was added over a period of forty minutes, the temperature being controlled between 70–80° C. by external cooling. The product contained 8.0% active chlorine, 9.8% total chlorine.

*Example 13*

By a similar procedure, the monohydroxyethyl ether of resorcinol was converted into a monochlorohydrin ether containing 12.0% active chlorine and 14.0% total chlorine.

*Example 14*

The glycerine ether of resorcinol was treated in a similar was and gave a chlorohydrin ether with 10.1% active chlorine and 12.8% total chlorine.

The following example illustrates the production of the monochlorohydrin ether of the isopropyl glycidyl ether adduct of bisphenol.

*Example 15*

To a one liter flask equipped with condenser, stirrer, thermometer and addition tube was weighed 344 grams (1 mol) of the reaction product of Example 10. Heat was applied and at 40° C., dropwise addition of epichlorohydrin was begun followed by 1 cc. of $BF_3$ etherate. All the epichlorohydrin, 92.5 g. (1 mol), was added in thirty minutes, the temperature being controlled below 62° C. by external cooling. Ten minutes after the final epichlorohydrin addition, the reaction was complete as evidenced by the drop in temperature. This material contained 6.5% active chlorine, 8.1% total chlorine.

The reaction of the dichlorohydrin ethers and the monochlorohydrin ethers with dehydrohalogenation to produce the epoxide resins is illustrated by the following examples:

*Example 16*

This example illustrates the reaction of 1 mol of a dichlorohydrin ether (of butanediol) with 4 mols of the monochlorohydrin ether of the hydroxyethyl ether of bisphenol with the use of 6 mols of sodium hydroxide in water as the dehydrohalogenating agent.

To a 2 l. flask equipped with condenser, thermometer, and stirrer was added 390 g. (1.07 mols) of the monochlorohydrin ether of the hydroxy ethyl ether of bisphenol and 73.5 g. (0.27 mol) of the dichlorohydrin ether of butanediol. Heat was applied to aid in mixing these two compounds. After solution was attained 66 g. of NaOH in 750 cc. $H_2O$ (1.65 mols, equivalent to chlorohydrin ether groups+3% excess) was added slowly. Heat was applied to bring the mixture to reflux (97–102° C.) and held at reflux for 30 minutes. The mixture was cooled, the aqueous salt layer was removed by decantation and the taffy resin was washed with hot water until neutral to litmus. The resin was dried by heating to 150° C. with vigorous agitation.

The product in 98% yield (397 g.) had a weight/epoxide of 2,260, chlorine content of 3.4%, Durran's melting point 58° C., Gardner viscosity (40% N.V. in butyl carbitol) H.

*Example 17*

This example illustrates the production of an epoxide resin from 1 mol of the dichlorohydrin ether of butanediol and 4 mols of the monochlorohydrin ether of the ethylene oxide adduct of resorcinol with 6 mols of aqueous alkali. The procedure used was the same as in Example 16.

The following materials were charged into the apparatus: Dichlorohydrin ether of butanediol (0.4) 110 g., monochlorohydrin ether or monohydroxy ethyl ether of resorcinol (1.6 mols) 394 g., NaOH (2.25 mols—5% excess) 101 g. $H_2O$ 500 cc.

The epoxide resin produced was obtained in an 89% yield (370 g.) with a weight per epoxide of 2570, a chlorine content of 3.4%, a Gardner viscosity (40% non-volatile in butyl carbitol) of H, and a Durran's melting point of 54° C.

*Example 18*

This example illustrates the reaction of 0.1 mol of the dichlorohydrin ether of Polypropylene Glycol 1200 and 1 mol of the monochlorohydrin ether of the monohydroxyethyl ether of bisphenol. The same procedure was used as in Example 16, using the following ingredients in the following amounts: Dichlorohydrin ether of Polypropylene Glycol 1200 (0.1 mol) 138 g. monochlorohydrin ether of hydroxyethyl ether of bisphenol (1 mol) 365 g., NaOH (1.325 mols—10% excess) 53 g., H₂O 500 cc.

The product obtained was an epoxide resin in 97% yield (445 g.) with a weight per epoxide of 5800, 2.2% chlorine, a Gardner viscosity (40% non-volatile in butyl carbitol) of F and a Durran's melting point of 43° C.

*Example 19*

This example illustrates a reaction product of 0.05 mol of the dichlorohydrin ether of Polypropylene Glycol 1200 and 1 mol of the monochlorohydrin ether of the hydroxyethyl ether of bisphenol. The same procedure was used as in Example 16, the following ingredients being charged to the apparatus: Dichlorohydrin ether of Polypropylene Glycol 1200 (0.05 mol) 69 g., monochlorohydrin ether of monohydroxy ethyl ether of bisphenol (1 mol) 365 g., NaOH (1.2 mols—10% excess) 48 g., H₂O 500 cc.

The epoxide resin obtained in 96% yield (378 g.) had a weight per epoxide of 12850, 2.6% chlorine, a Gardner viscosity (40% non-volatile in butyl carbitol) of H—I and a Durran's melting point of 61° C.

In a similar way, other monohydroxyalkyl and hydroxy-aliphatic ethers of dihydric phenols can be prepared and reacted with epichlorohydrin to give the monochlorohydrin ethers, and these can be used in a similar manner and subjected to dehydrohalogenation in admixture with the dichlorohydrin ethers of the polyhydric alcohols. Examples 9 to 15 are illustrative of such ethers and monochlorohydrin ethers.

Similarly, other dichlorohydrin ethers of polyhydric alcohols can be prepared and admixed with the monochlorohydrin ethers and subjected to dehydrohalogenation to form the epoxide resins. Examples 1 to 8 are illustrative of such dichlorohydrin ethers.

The epoxide resin products of the present invention are useful for various purposes, including esterification with drying oil or other acids to form drying esters or other esters, and by reaction with cross-linking agents such as amines and polyamines, diisocyanates, amine-aldehyde and phenol-aldehyde resins, etc., to form complex or insoluble product.

The new products are useful as or in coating compositions to form films or coatings which can be cured with amine or other curing agents such as are used in the curing of epoxide resins.

We claim:

1. The method of producing aliphatic modified epoxide resins which comprises forming a mixture of a di-(chlorohydrin) ether of a polyhydric alcohol and a monochlorohydrin ether of a hydroxy-aliphatic ether of a dihydric phenol, said monochlorohydrin ether containing an unreacted phenolic hydroxyl group, the proportion of monochlorohydrin ether being at least 1 mol for each mol of the dichlorohydrin ether and subjecting the mixture to a dehydrohalogenation reaction with an alkaline dehydrohalogenating agent.

2. The method of producing aliphatic modified epoxide resins which comprises forming a mixture of (*a*) monochlorohydrin ethers of hydroxy-aliphatic ethers of a dihydric phenol having the following general formula

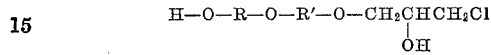

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, and (*b*) a di-(chlorohydrin ether of a polyhydric alcohol in the proportion of not more than 1 mol of the dichlorohydrin ether per mol of the monochlorohydrin ether and subjecting the mixture to a dehydrohalogenation reaction with an alkaline dehydrohalogenating agent.

3. Aliphatic modified epoxide resins which are dehydrohalogenation reaction products of a previously formed mixture of a di(chlorohydrin) ether of a polyhydric alcohol and of a monochlorohydrin ether of a hydroxy-aliphatic ether of a dihydric phenol, said monochlorohydrin ether containing an unreacted phenolic hydroxyl group, and having a composition represented by the following formula:

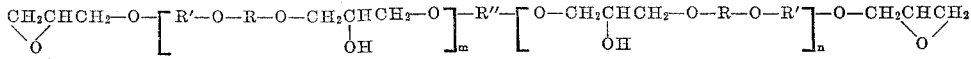

in which R is the aromatic nucleus of a dihydric phenol, R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, R'' is a divalent residue of a polyhydric alcohol, *m* and *n* are positive whole numbers equal to or greater than 0, and *m* plus *n* equals a whole number of at least 1.

References Cited in the file of this patent

UNITED STATES PATENTS

| | | |
|---|---|---|
| 2,456,408 | Greenlee | Dec. 14, 1948 |
| 2,581,464 | Zech | Jan. 8, 1952 |
| 2,712,000 | Zech | June 28, 1955 |